United States Patent
Off

(10) Patent No.: US 10,456,687 B1
(45) Date of Patent: *Oct. 29, 2019

(54) SYSTEM AND METHOD FOR INTERACTIVE DIGITAL CONTENT GENERATION

(71) Applicant: Gregory S. Off, San Francisco, CA (US)

(72) Inventor: Gregory S. Off, San Francisco, CA (US)

(*) Notice: Subject to any disclaimer, the term of this patent is extended or adjusted under 35 U.S.C. 154(b) by 363 days.

This patent is subject to a terminal disclaimer.

(21) Appl. No.: 15/213,205

(22) Filed: Jul. 18, 2016

Related U.S. Application Data

(63) Continuation of application No. 14/507,683, filed on Oct. 6, 2014, now Pat. No. 9,393,495, which is a continuation of application No. 13/524,821, filed on Jun. 15, 2012, now Pat. No. 8,856,650.

(51) Int. Cl.
| | | |
|---|---|---|
| *A63F 13/00* | (2014.01) | |
| *A63F 13/77* | (2014.01) | |
| *G06F 17/24* | (2006.01) | |
| *G06F 3/0482* | (2013.01) | |
| *G06F 3/0484* | (2013.01) | |

(52) U.S. Cl.
CPC ............ *A63F 13/77* (2014.09); *G06F 3/0482* (2013.01); *G06F 3/0484* (2013.01); *G06F 17/248* (2013.01)

(58) Field of Classification Search
CPC ........ A63F 2300/6018; A63F 2300/308; A63F 13/48
See application file for complete search history.

(56) References Cited

U.S. PATENT DOCUMENTS

| | | |
|---|---|---|
| 6,377,956 B1 | 4/2002 | Hsu |
| 6,526,423 B2 | 2/2003 | Zawadzki |
| 6,862,696 B1 | 3/2005 | Voas |
| 6,862,969 B1 | 3/2005 | Graf |
| 7,747,942 B2 | 6/2010 | Dasari |
| 8,615,712 B2 | 12/2013 | Porter |
| 8,966,436 B2 | 2/2015 | Pryhuber |
| 2003/0083943 A1 | 5/2003 | Adams |
| 2003/0095790 A1 | 5/2003 | Joshi |
| 2004/0087363 A1 | 5/2004 | Bogenn |
| 2004/0147314 A1 | 7/2004 | Lemay |
| 2004/0242322 A1 | 12/2004 | Montagna |
| 2005/0022104 A1 | 1/2005 | Wrenholt |

(Continued)

*Primary Examiner* — Reginald A Renwick
(74) *Attorney, Agent, or Firm* — Sheppard Mullin Richter & Hampton LLP

(57) ABSTRACT

The disclosure relates to a system for automated generation and/or execution of an interactive content object having content related to a video game application. In some implementations, the interactive content object may comprise interactive digital content that may be distributed to and/or executed on one or more computer system gaming platforms and/or other interactive media devices. Interactive content objects may be configured such that they may be included in the video game application and/or executed by the video game application. Interactive content objects may also be configured as standalone products. Interactive content objects may be configured such that they may be remotely patched and/or updated without updating the video game application. In some implementations, the interactive content object may comprise one or more of an instruction manual, a strategy guidebook, a cheat book, a mini-game, episodic content, and/or other applications.

23 Claims, 12 Drawing Sheets

(56) References Cited

U.S. PATENT DOCUMENTS

| | | |
|---|---|---|
| 2006/0107202 A1 | 5/2006 | Sukach |
| 2007/0136663 A1 | 6/2007 | Grigoriadis |
| 2008/0250038 A1 | 10/2008 | Di |
| 2009/0029752 A1 | 1/2009 | Sispoidis |
| 2009/0135177 A1 | 5/2009 | Strietzel |
| 2009/0150808 A1 | 6/2009 | Aldrey |
| 2010/0241990 A1 | 9/2010 | Gabriel |
| 2010/0287464 A1 | 11/2010 | Grigoriadis |

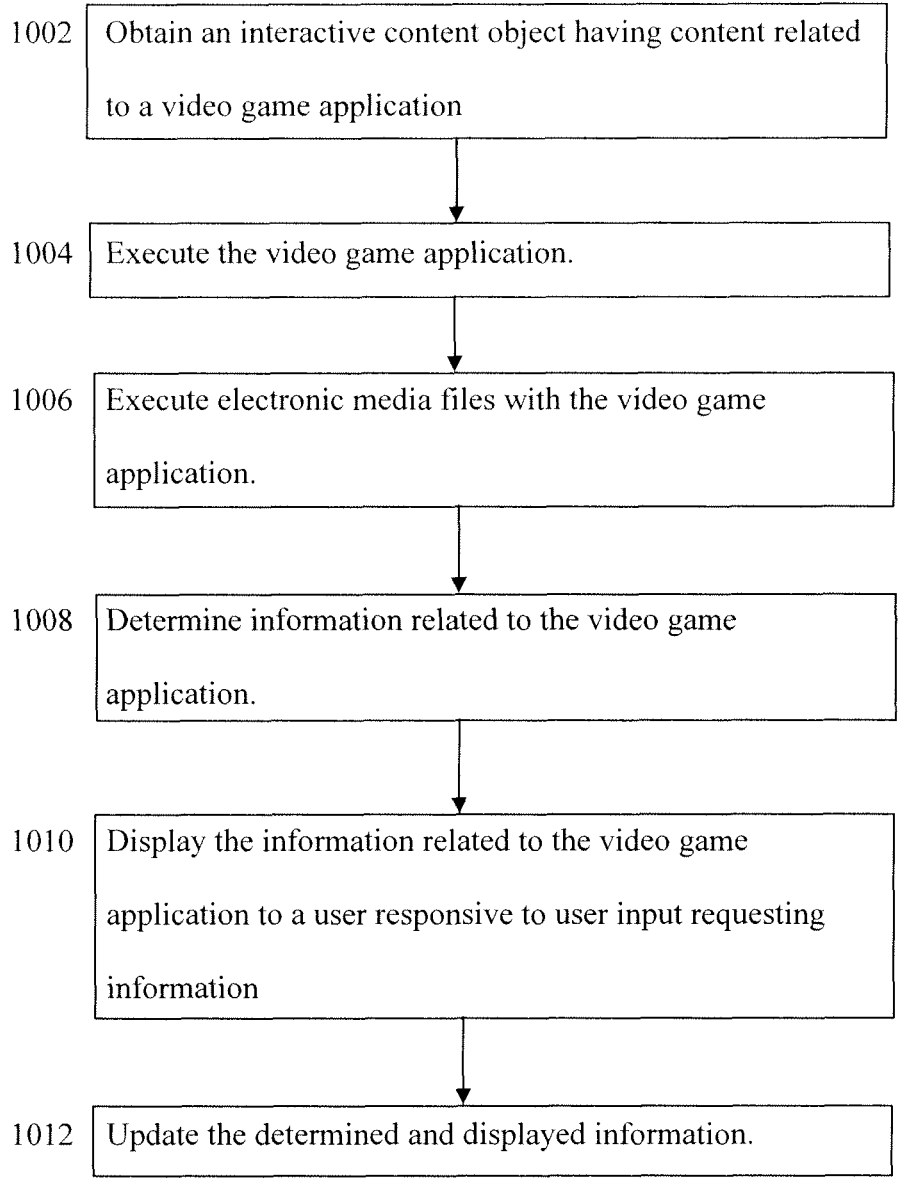

SYSTEM AND METHOD FOR INTERACTIVE DIGITAL CONTENT GENERATION

FIELD

The disclosure relates to a system for automated generation and/or execution of an interactive content object having content related to a video game application.

BACKGROUND

Typically, gaming software requires an instruction manual. Other support documentation (e.g., strategy guides, a cheat book, legal documents) is also generated to support gaming software. Many publishers are currently engaged in an effort to reduce print costs by finding a digital solution to this requirement. The digital solutions generated by publishers thus far are typically developed by a third party and either separate from the gaming software (no interaction between the gaming software and the digital solutions generated by publishers, such as a downloadable PDF or image from a website), or are rudimentary and static. As such, current manuals and/or other support documentation are constructed of a static image and are only navigable through a page forward/page back interface.

SUMMARY

One aspect of the disclosure relates to a system for automated generation and/or execution of an interactive content object having content related to a video game application. In some implementations, the interactive content object may have content related to a video game application. In some implementations, the interactive content object may comprise interactive digital content that may be distributed to and/or executed on one or more computer system gaming platforms and/or other interactive media devices (e.g., Xbox 360, PlayStation 3, PlayStation Vita, Mac, PC, Wii, 3DS, iOS, Android, Wii U, Xbox 720 (current work in progress name for the next Microsoft game console), PlayStation 4 (current work in progress name for the next Sony PlayStation console), and future unannounced consoles/platforms). The interactive content object may be configured such that it may be included in the video game application and/or executed by the video game application. In some implementations, the interactive content object may be executed by third party software. In some implementations the interactive content object may be configured to run separately from the video game application. The interactive content object may be configured such that it may be remotely patched and/or updated (e.g., automatically) with or without updating the video game application. In some implementations, the interactive content object may comprise electronic media files, a media player, and/or other components.

The media player may be configured to execute one or more electronic media files within the video game application. The media player may be executed by the video game application. The interactive content object may be configured to be executed in the video game application, by the video game application, such that the interactive content object appears as part of the video game interface.

In some implementations, executing electronic media files with the video game application may comprise determining information related to the video game application. Determining information related to the video game application may comprise reading current game play data from the video game application, reading saved data from the video game application, performing a search within the video game application based on user input, tracking video game application metrics, and/or determining other information. In some implementations, executing electronic media files with the video game application may comprise updating the determined information based on one or more of user input, the user's progression through the video game application, or an electronic update to the interactive content object.

In some implementations, the media player may be configured to "pop up" within the video game application. In some implementations, the media player may be an Adobe Flash media player. In some implementations, the media player is a custom built player. The interactive content object may be configured to include views and/or video separate from the video game application such that the separate views and/or video still appear within videogame application.

The electronic media files and/or the media player may include technical elements configured to aid in computer system gaming platform and/or other interactive media device integration. For example, the executable electronic media files and/or the media player may be configured to call up a platform's virtual keyboard, read saved data from the video game application, search for text, track videogame application metrics, and/or communicate with external networks, databases, and/or the internet. Communication with external networks, databases, and/or the internet may provide the ability to permit post-development communication (e.g., allowing remote updating). In some implementations, remote updating may comprise automatic remote updating. In some implementations the electronic media files and/or the media player may be configured with file types that are different than the file types of the video game application such that the interactive content object may be remotely patched and/or updated with or without updating the video game application.

In some implementations, the interactive content object may comprise one or more of an instruction manual, a strategy guidebook, a cheat book, a mini-game, episodic content, a digital catalog, and/or other applications.

The instruction manual may comprise stacked views navigable in forward and/or backward directions, a navigable and linkable table of contents, a search function (able to search within the video game application and/or across a network such as the internet), and/or other features. In some implementations, the instruction manual may utilize Actionscript and/or Flash, rich media including animation, embedded video, expandable stills, custom non-linear navigation, and/or other functionality.

A strategy guidebook may be configured to interact with the progress of a user (e.g., by reading save files) through the video game application or other related data files and deliver content appropriate to the users' current game location. In some implementations, the strategy guidebook may be configured to use user tracking metrics to offer strategy content at difficult points in the user's progress through the video game application. For example, a user may be stuck at a certain point and the strategy guidebook may be configured to offer a strategy video for the troubling section within the game environment. In some implementations, the strategy may be offered for a fee.

In some implementations, the interactive content object may be generated with a web content application generator. A web application content generator may comprise a set of web development tools configured to allow individuals with limited design skill to generate a web based application with content related to the video game application.

The system for automated generation of the interactive content object may comprise non-transient electronic storage and a processor. The non-transient electronic storage may be configured to store electronic information. The processor may be configured to execute computer program modules. The computer program modules may comprise a parameter module, a template generation module, a template population module, an interactive content object generation module, and a storage module.

The parameter determination module may be configured to determine parameters related to the video game application. The parameters determined by the parameter module may comprise one or more of the video game application assets, an interactive media device configured to run the video game application, a video game application controller, a game genre, a target demographic, and/or other parameters.

The template generation module may be configured to generate a template by selecting one or more views from a set of template components. The selection of the one or more template views may be based on information determined by the parameter module.

The template population module may be configured to populate the template with information related to the video game application. The template population module may be configured to guide the user to populate the template with information related to the video game application. The template population module may be configured to guide a user to populate one or more fields of one or more views of the template with information related to the video game application. The user may populate the one or more fields via a user interface. The user interface may be configured to provide an interface between the system and the user through which the user provides information to and receives information from the system.

The interactive content object generation module may be configured to generate the interactive content object based on the populated template. As described above, the interactive content object may comprise electronic media files, a media player and/or other components. The media player may be configured to execute one or more of the electronic media files within the video game application. The media player may be executable by the video game application. The interactive content object may comprise one or more of an instruction manual, a strategy guidebook, a cheat book, a mini-game, or episodic content. A user may determine the type of interactive content object by making selections via the user interface.

The storage module may be configured to store the interactive content object on the non-transient electronic storage.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 12 illustrates a method to execute an interactive content object.

DETAILED DESCRIPTION

Figure 1:
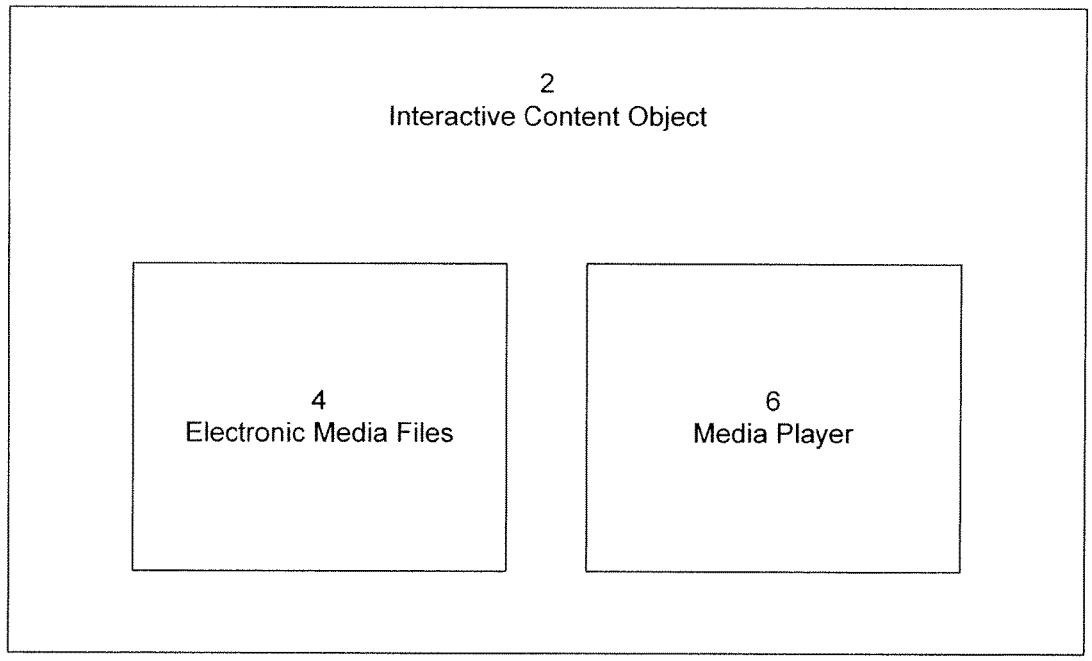
FIG. 1 is a schematic illustration of an interactive content object.

FIG. 1 is a schematic illustration of an interactive content object 2. In some implementations, interactive content object 2 may have content related to a video game application. In some implementations, interactive content object 2 may comprise interactive digital content that may be distributed to and/or executed on one or more computer system gaming platforms and/or other interactive media devices (e.g., Xbox 360, PlayStation 3, PlayStation Vita, Mac, PC, Wii, 3DS, iOS, Android, Wii U, Xbox 720 (current working title), PlayStation 4 (current working title), and future unannounced consoles/platforms). Interactive content object 2 may be configured such that it may be included in the video game application and/or executed by the video game application. In some implementations, the interactive content object may be executed by third party software. In some implementations the interactive content object may be configured to run separately from the video game application. Interactive content object 2 may be configured such that it may be remotely patched and/or updated (e.g., automatically) with or without updating the video game application. In some implementations, interactive content object 2 may comprise electronic media files 4, a media player 6, and/or other components.

Media player 6 may be configured to execute one or more electronic media files 4 within the video game application. Media player 6 may be executed by the video game application. Interactive content object 2 may be configured to be executed in the video game application, by the video game application, such that interactive content object 2 appears as part of the video game interface.

In some implementations, executing electronic media files 4 with the video game application may comprise determining information related to the video game application. Determining information related to the video game application may comprise reading current game play data from the video game application, reading saved data from the video game application, performing a search within the video game application based on user input, tracking video game application metrics, and/or determining other information. In some implementations, executing electronic media files 4 with the video game application may comprise updating the determined information based on one or more of user input, the user's progression through the video game application, or an electronic update to interactive content object 2.

In some implementations, media player 6 may be configured to "pop up" within the video game application. In some implementations, media player 6 may be an Adobe Flash media player. Interactive content object 2 may be configured to include views and/or video separate from the video game application such that the separate views and/or video still appear within videogame application.

Electronic media files 4 and/or media player 6 may include technical elements (e.g., console languages, resolution, parental security level, etc.) configured to aid in computer system gaming platform and/or other interactive media device integration. For example, the executable electronic media files 4 and/or media player 6 may be configured to call up a platform's virtual keyboard, read saved data from the video game application, search for text, track videogame application metrics, and/or communicate with external networks, databases, and/or the internet. Communication with external networks, databases, and/or the internet may provide the ability to permit post-development communication (e.g., allowing remote updating). In some implementations, remote updating may comprise automatic remote updating. In some implementations electronic media files 4 and/or media player 6 may be configured with file types that are different than the file types of the video game application such that interactive content object 2 may be remotely patched and/or updated with or without updating the video game application.

In some implementations, interactive content object 2 may be generated with a web application content generator. A web application content generator may comprise a set of web development tools configured to allow individuals with limited design skill to generate a web based application. In some implementations, the interactive content object may comprise one or more of an instruction manual, a strategy guidebook, a cheat book, a mini-game, episodic content, digital catalog, and/or other applications.

The instruction manual may comprise stacked views navigable in forward and/or backward directions, a navigable and linkable table of contents, a search function (able to search within the video game application and/or across a network such as the internet), and/or other features. In some implementations, the instruction manual may utilize Actionscript and/or Flash, rich media including animation, embedded video, expandable stills, custom non-linear navigation, and/or other functionality.

A strategy guidebook may be configured to interact with the progress of a user (e.g., by reading save files) through the video game application and deliver content appropriate to the users current game location. In some implementations, the strategy guidebook may be configured to use user tracking metrics to offer strategy content at difficult points in the user's progress through the video game application. For example, a user may be stuck at a certain point and the strategy guidebook may be configured to offer a strategy video for the troubling section through in-game dialog box and/or violator. In some implementations, the strategy may be offered for a fee.

It will be appreciated that the description herein of the distribution, execution, and/or other associates of interactive content object 2 with a "video game application" is not intended to be limiting. In some implementations, interactive content object 2 may be associated with (e.g., distributed with, executed by, and/or associated with in other ways) other types of software applications executed on one or more client computing platforms.

Figure 2:
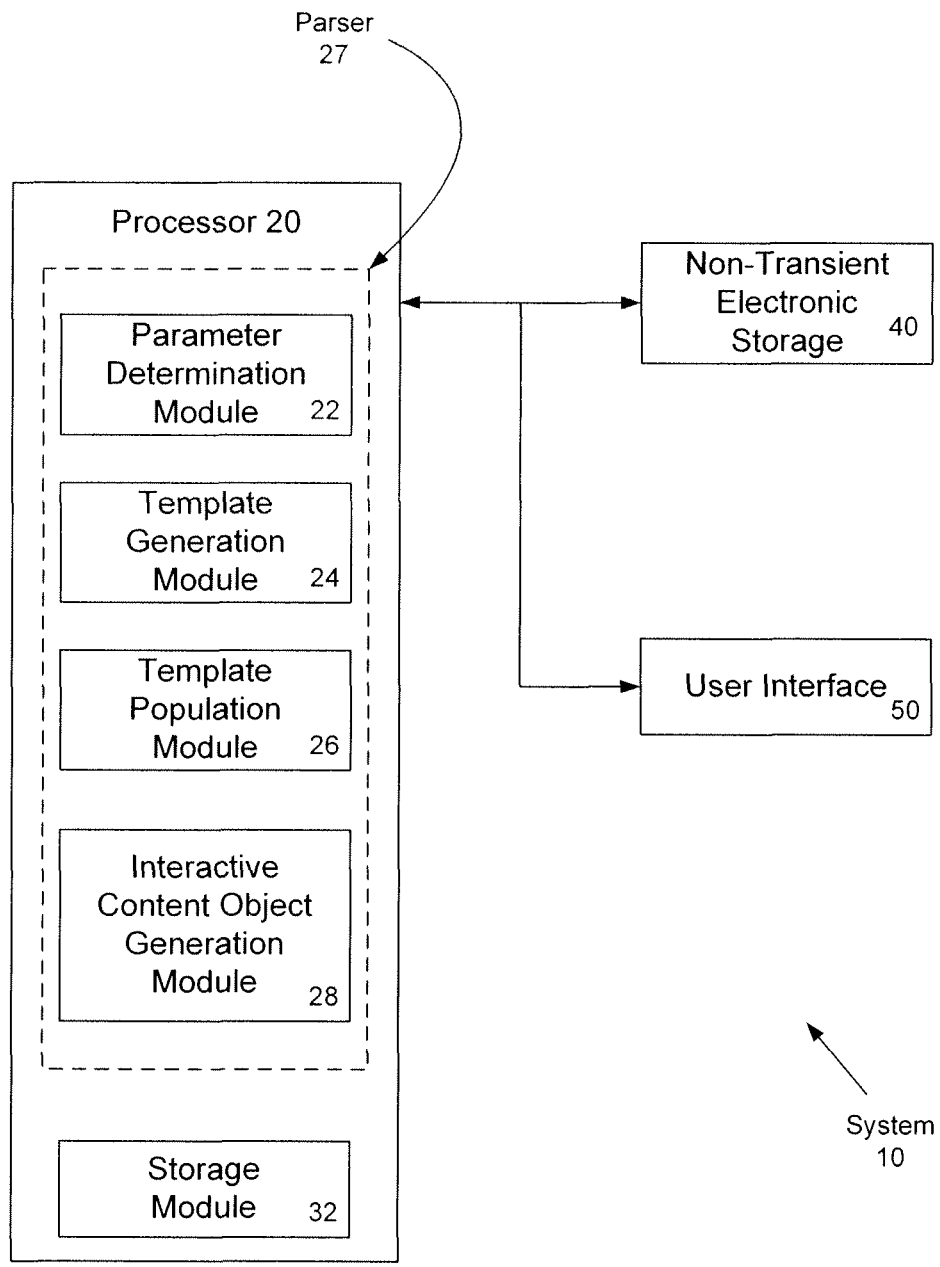
FIG. 2 is a schematic illustration of a system for automated generation of the interactive content object.

FIG. 2 is a schematic illustration of a system 10 for automated generation of the interactive content object having content related to a video game application. System 10 may be configured to generate the interactive content object with minimal developer support. In some implementations, system 10 comprises a processor 20, non-transient electronic storage 40, user interface 50, and/or other components.

As shown in FIG. 2, processor 20 may be configured to execute one or more computer program modules. The one or more computer program modules comprise one or more of a parameter determination module 22, a template generation module 24, a template population module 26, an interactive content object generation module 28, a storage module 32, and/or other modules.

Parameter determination module 22 is configured to determine one or more parameters within system 10. The one or more parameters within system 10 may comprise parameters related to the video game application, and/or other parameters. The video game application may comprise a game engine, a rendering engine, textures, sounds, animation, graphics, scripting, and/or other components. The parameters determined by parameter determination module 22 may comprise one or more of the video game application assets, an interactive media device configured to run the video game application, a video game application controller, a game genre, a target demographic, console, template items, boiler plate documentation, and/or other parameters. Parameter module 22 may determine parameter information by reading current game play data from the video game application, reading saved data from the video game application, performing a search within the video game application, based on user input, tracking video game application metrics, and/or by other methods. The information determined by parameter determination module 22 may be used during template generation by template generation module 24, template population by template population module 26, and/or used for other uses.

Template generation module 24 may be configured to generate a template for the interactive content object generated by system 10. Template generator module 24 may be configured to generate a template by selecting one or more views and/or other template components (e.g., entry fields, text, graphics, navigational linkages, video fields) from a set of template components. In some implementations, the set of template components may exist at the time template control module begins to generate a template. In some implementations, the template components may correspond to different parameters of interactive content object 2. The set of template components may be determined at manufacture, determined from information entered by a user via user interface 50, determined from previous template generation by template generation module 24, and/or determined by another method. Information entered by a user via user interface 50 may include, for example, the type of interactive content object (e.g., instruction manual, a strategy guidebook, a cheat book, a mini-game, episodic content, etc.). The selection of the one or more template views may be based on information determined by parameter determination module 22, and/or other information. Based on the parameters determined by parameter determination module 22 and/or other information, template generation module 24 may be configured to generate a template with an appropriate file size, resolution, and/or other specifications relative to the video game application.

Figure 3:
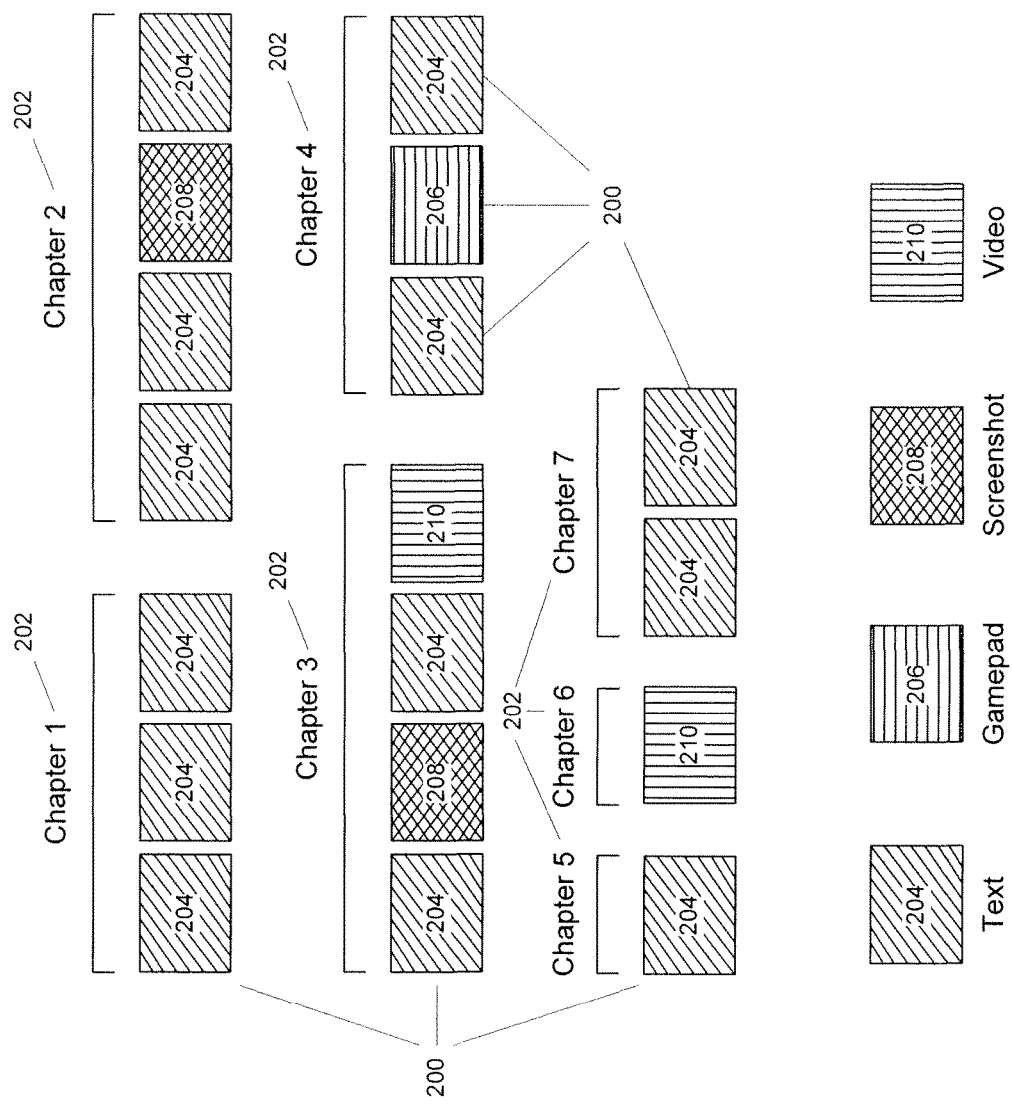
FIG. 3 illustrates various views of an instruction manual example organized into chapters.

By way of a non-limiting example, FIG. 3-FIG. 7, show different views of an instruction manual template generated by template generation module 24 for a video game application. It will be appreciated that the description herein of the instruction manual template is not intended to be limiting. In some implementations, one or more of the described views, and/or other views may be generated and/or populated for an interactive content object other than an instruction manual template. FIG. 3 illustrates various views 200 of the instruction manual organized into chapters 202. Each chapter 202 may comprise one or more views 200.

Views 200 may have a designated content type. In the example shown in FIG. 3, the designated content types comprise text 204, gamepad 206, screenshot 208, and video 210. The different template views 200 may be configured to receive content from the template population module 26 (shown in FIG. 2), content entered by a user via user interface 50 (shown in FIG. 2), content from non-transient electronic storage 40 (shown in FIG. 2), and/or other content. Text content 204 template views may be configured to receive descriptive language about the video game application, text acquired from the video game application, and/or other text content. Gamepad 206 template views may be configured to receive information related to the controller for a gaming system or other interactive media device. Screenshot 208 template views may be configured to receive images related to the video game application. Video 210 template views may be configured to accept video related to the video game application. The content types described in FIG. 3 are for illustrative purposes and are not intended to be limiting. The content types for views generated by template generation module 24 (shown in FIG. 2) may include content types in addition to and/or other than those listed above. The different views may not be limited to providing only one type of content. For example, one or more views 200 may provide one or more types of content (e.g., text 204 and video 210).

Template generation module 24 (shown in FIG. 2) may be configured to generate a template such that a user may navigate through views 200 linearly and/or non-linearly. Linear navigation may comprise scrolling between views 200 visiting each view in a pre-determined order. During linear navigation a user may be able to scroll in a forward direction from the final view in one chapter 202 to the first view in the following chapter 202 (and/or vice versa if scrolling in the reverse direction). Non-linear navigation may comprise a user navigating to a specific view 200 by making a selection from a table of contents included in the generated template, performing a search and making a selection from the search results, manually navigating to a desired view, and/or by other methods. In some implementations, a template may comprise one view 200 (e.g., for a webisode) with no view to view navigation necessary.

Figure 4:
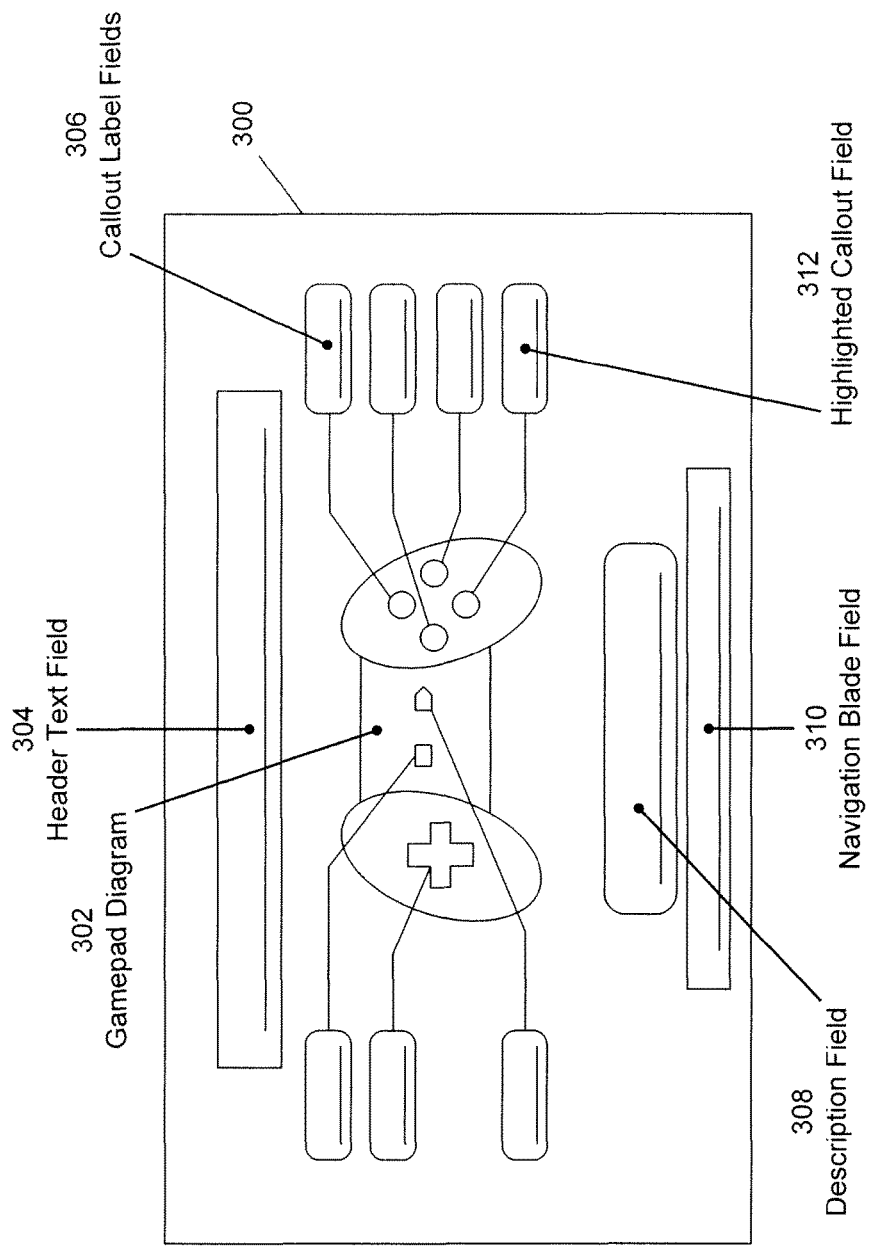
FIG. 4 depicts an example of a gamepad content view.

FIG. 4 depicts an example of a gamepad content view 300 generated by template generation module 24 (shown in FIG. 2). As shown in FIG. 4, in some implementations, gamepad view 300 may comprise a gamepad diagram field 302, a header text field 304, one or more callout label fields 306, a description field 308, a navigation blade field 310, one or more highlighted callout fields 312, and/or other fields. Gamepad diagram field 302 may be generated by template generation module 24 (shown in FIG. 2). Gamepad diagram field 302 may be generated based on information related to the interactive media device configured to run the video game application (determined by parameter determination module 22 shown in FIG. 2). Navigation blade field 310 may indicate to a user the position of view 300 relative to other views in the template. Navigation blade field 310 may be configured to allow a user to navigate to another view by selecting another view within navigation blade field 310. Gamepad view 300 may be configured to include other fields in addition to and/or instead of those shown in FIG. 4.

Figure 5:
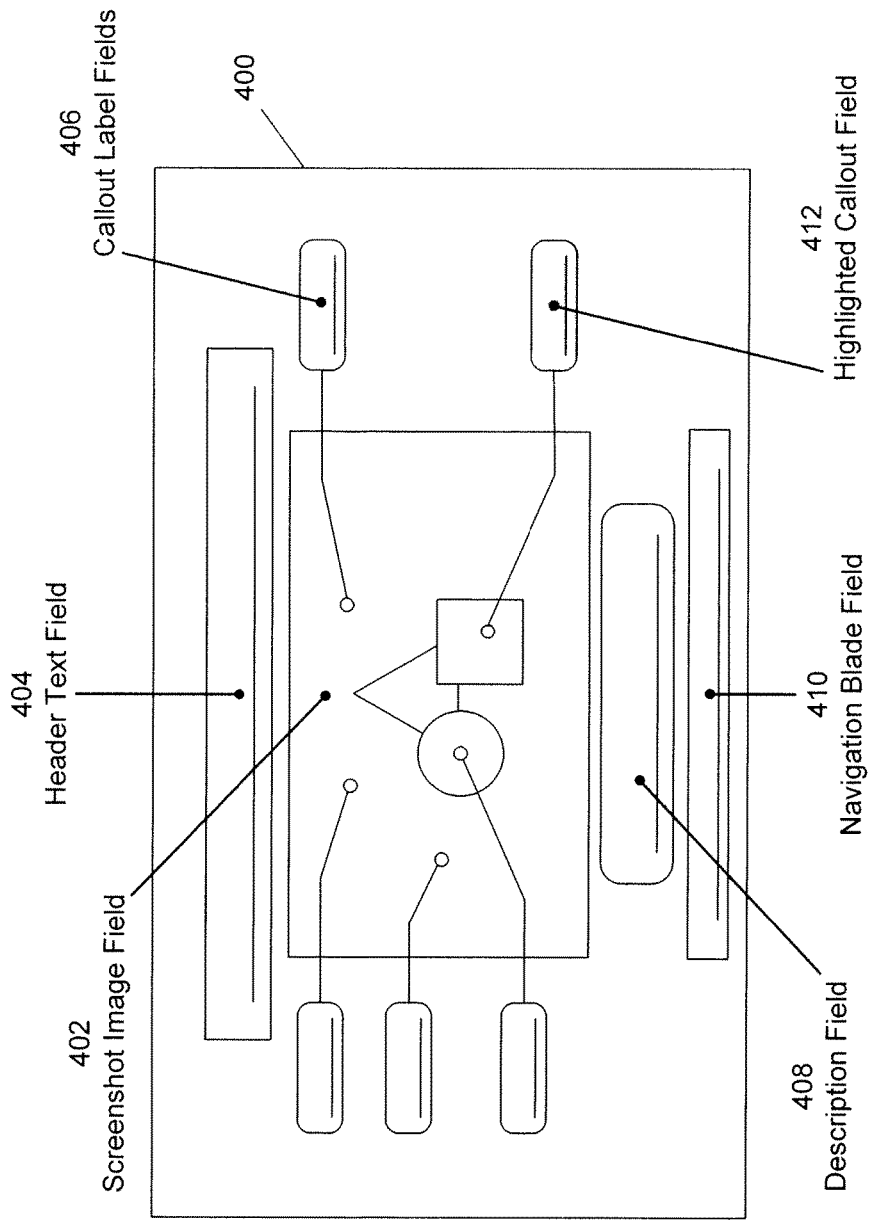
FIG. 5 depicts an example of a screenshot content view.

FIG. 5 depicts an example of a screenshot content view 400. As shown in FIG. 5, in some implementations, screen shot view 400 may comprise a screenshot image field 402, a header text field 404, one or more callout label fields 406, a description field 408, a navigation blade field 410, one or more highlighted callout fields 412, and/or other fields. Screenshot image field 402 may be configured to receive one or more images related to the video game application. Screenshot content view 400 may be configured to include other fields in addition to and/or instead of those shown in FIG. 5.

Figure 6:
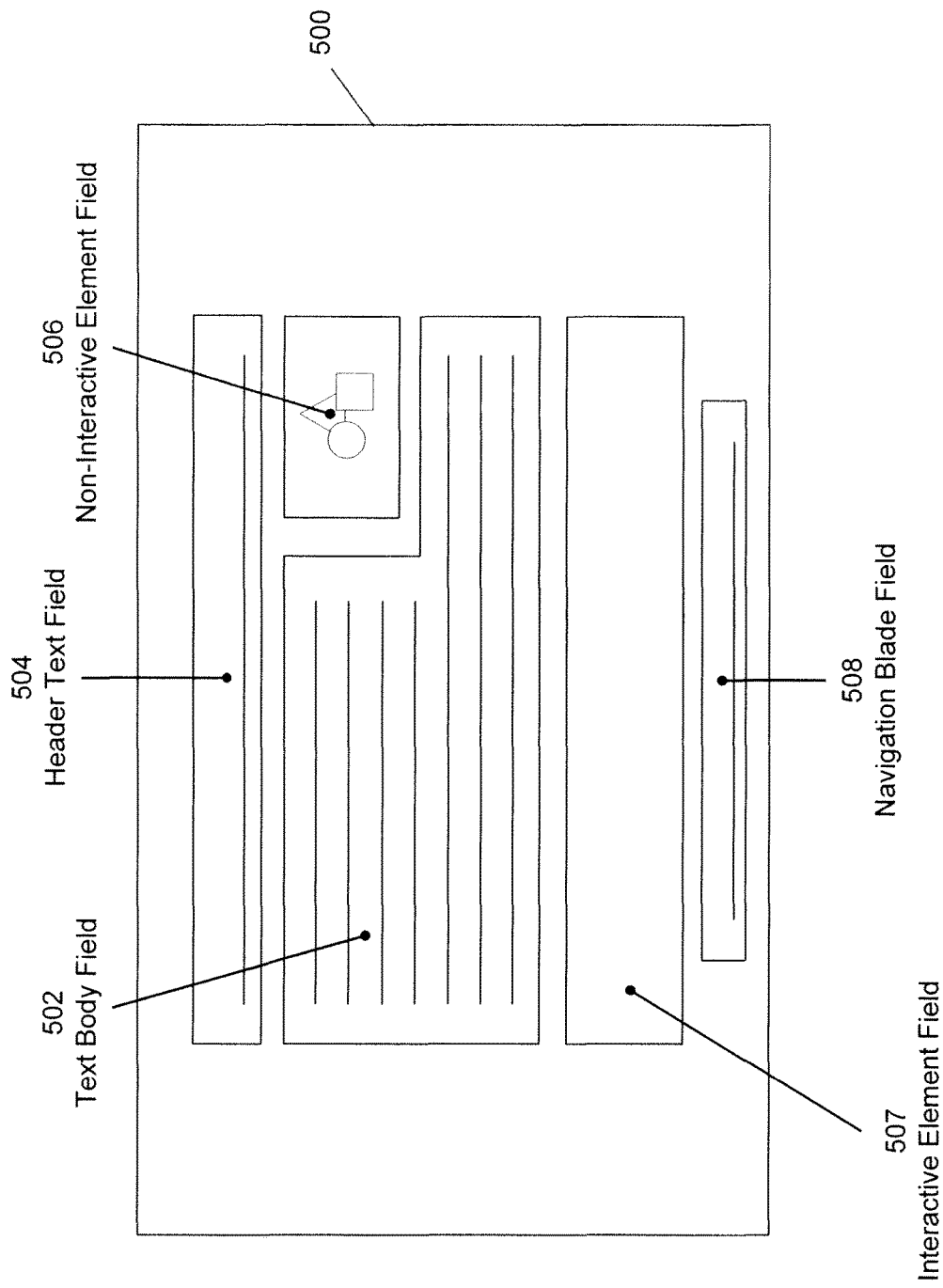
FIG. 6 depicts an example of a text content view.

FIG. 6 depicts an example of a text content view 500. As shown in FIG. 6, text content view 500 may comprise a text body field 502, a header text field 504, a non-interactive element field 506, an interactive element field 507, a navigation blade field 508, and/or other fields. Non interactive element field 506 may be configured to receive images, videos, and/or other non interactive information related to the video game application that corresponds to the text that text body field 502 is configured to receive. Interactive element field 507 may comprise a selectable item and/or graphic within the context of view 500 inside the application. Text content view 500 may be configured to include other fields in addition to and/or instead of those shown in FIG. 6.

Figure 7:
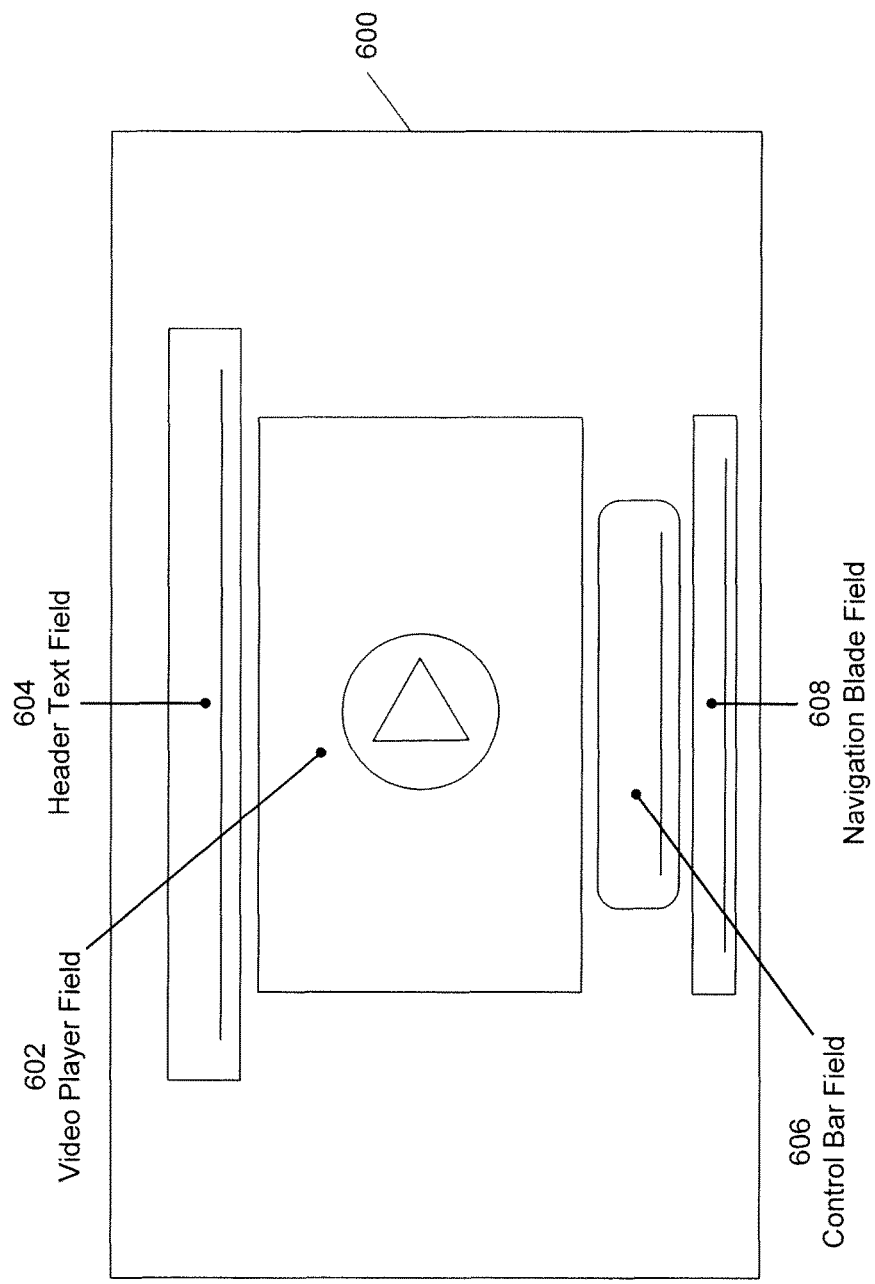
FIG. 7 depicts an example of a video content view.

FIG. 7 depicts an example of a video content view 600. As shown in FIG. 7, video content view 600 may comprise a video player field 602, a header text field 604, a control bar field 606, a navigation blade field 608, and/or other fields. Video player field 602 may be configured to play video related to the video game application. Control bar field 606 may be configured to include controls such that a user may play a video within video player field 602. Video content view 600 may be configured to include other fields in addition to and/or instead of those shown in FIG. 7. By way of a non-limiting example a single video content view may be generated as the template for a webisode interactive content object.

Returning to FIG. 2, template population module 26 may be configured to populate the template (e.g., the various views and/or fields described above) generated by template generation module 24 with information related to the video game application. In some implementations, template population module 26 may be configured to populate the template automatically. Template population module 26 may be configured to populate the template automatically based on information determined by parameter determination module 22, template generation module 24, information entered by a user via user interface 50, information stored in electronic storage 40, information related to the video game application determined by template population module 26, and/or other information. In some implementations, template population module 26 may be configured to control user interface 50 to guide a user to populate the template with information related to the video game application. In some implementations template population module 26 is configured control user interface 50 to guide a user to populate one or more fields (e.g., 302, 304, 306, 308, 310, 312 shown in FIG. 4) of one or more views (e.g., 200 shown in FIG. 3) of the template with information related to the video game application. In some implementations, the user may populate the one or more fields by entering information via user interface 50. In some implementations, the user may populate the one or more fields by selecting information from a list of possible choices previously generated by template population module 26.

Template population module 26 may be configured to customize (and/or guide a user to customize) the interactive content object generated by system 10 with third party media and text assets (e.g., MS Word, Adobe PhotoShop, Adobe Illustrator, Adobe InDesign, video files, etc.). Template population module 26 may be configured to populate the template generated by template generation module 24 with a search engine, an index generator, a navigable table of contents, expandable assets, embedded media, and/or other features. In some implementations, template population module 26 may be configured to populate the template generated by template generation module 24 with legal pages and/or views of other standardized information.

Interactive content object generation module 28 may be configured to generate the interactive content object. Interactive content object generation module 28 may be configured to generate the interactive content object based on the populated template, and/or other information. The interactive content object may comprise electronic media files and/or a media player as described with respect to FIG. 1 above.

In some implementations, the functionality attributed to parameter determination module 22, template generation module 24, template population module 26, interactive content object generation module 28, and/or other modules may be performed by a parser 27. In some implementations, parser 27 may comprise a boot application configured to launch the interactive content generation application. The boot application may be created on a server inside a firewall accessible from within a network protected by the firewall.

Parser 27 may be configured to generate a project type selection page view. The project type selection page view may allow a user to set the project type and parameters of the output interactive content object. Users may select the overall template (e.g., a manual) wherein additional template options may be added as the complexity of the interactive content object increases. Custom information corresponding to the selected template may also be added.

By way of a non-limiting example, when a manual project type is selected by the user, the user may be prompted to input a gaming system type and select one or more available warning, legal, warranty, and/or other publisher options. Text fields may be available to enter a game's legal information and proper name, which may be inserted into the warning, legal, warranty, and/or other publisher options.

Parser 27 may be configured to generate a document upload screen view. In order to construct an interactive content object file, a properly formatted document file (e.g., .doc) and working fonts may be uploaded into the interactive content object generation application. A user may continue to generate the interactive content object via parser 27 once both have been uploaded.

Parser 27 may be configured to generate selectable format settings. Parser 27 may be configured to review the .doc file, for example, and create an active list of available interactive content object formats. A designer may use dropdown/value inputs that correspond to the different formats to set the font (selected from those uploaded), size, base style, colors, and/or other parameters when formatting the interactive content object. Once the format of the interactive content object is established, the user may preview the format and/or enter the parser's asset uploader.

Parser 27 may include an asset uploader. From within the asset uploader, users may navigate back to the format settings page, or forward to the preview page, for example.

The asset uploader may be configured to link project assets (e.g., .umd, .jpg, .mp3, and other usable/properly formatted file types). The parser may be configured to creates a set of lists of requested assets in the .doc, for example, broken down by type. By default, all assets may be set to use an evergreen series of FPO assets. The user may collect assets of a specific type into a directory and then point each list to the correct directory. When the correct naming convention is used by the user, the files should link appropriately. If needed, the user may link individual files within a list.

The asset uploader may be configured to refine parameters of the project assets. In some implementations, each requested asset list may present a selectable refinement tab. When a tab is selected, the user may select individual assets of the type presented in the list and view their lay out with standard parameters. The user may adjust cretin parameters (such as gutter pixel width). Adjustments may be reflected in the base word document, for example. (Changes that go beyond the refinements of the standard parameters may enhance a preview of the application).

Parser 27 may include a preview function. The preview function may allow the user to review the final output before generating the interactive content object. The content of the interactive content object may be displayed in a basic layout form with page brakes and spacing accurately displayed. A launch icon for modal content may be shown in the flow where the icon may be displayed during use. Modal content may be shown in boxes at the bottom of the page, for example, where it is tethered.

The preview function may facilitate a user navigating back to any point in the parser flow to make changes, saving the project as a .doc, for example, that represents the addition of warning, legal, warranty, and/or other pages, formatting changes based on the format settings adjustments, and/or any refinements made in the asset uploader.

Parser 27 may include an update function. For example, if anything appears incorrect in the preview, the user may make and save changes to the .doc, for example, and re-upload it using the update function. The project may be rebuilt using the new .doc and the preview may be updated with the new content (e.g., after the project has been saved).

Parser 27 may include an export function. When the user is satisfied with the preview the export function may generate an interactive content object file and export it to a destination of the users choice. In some implementations, the export function may only be available after the project has been saved. If changes are made to an aspect of the parser content after a save is made, then the changed file may remain unavailable until a new save is made.

Figure 8:
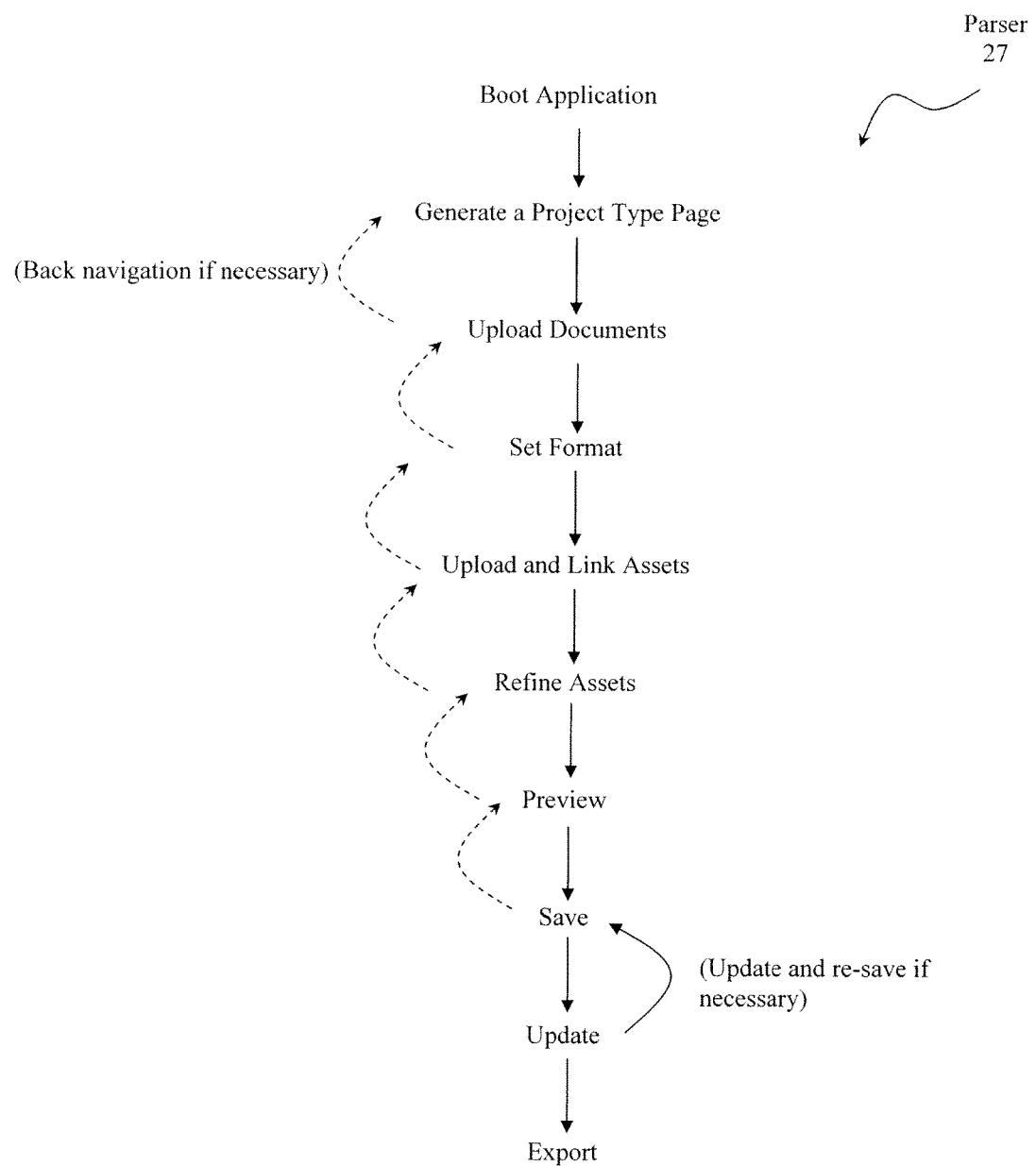
FIG. 8 illustrates the functionality of a parser.

FIG. 8 is an example schematic illustration of the functionality of parser 27. As shown in FIG. 8, parser 27 may be configured to boot the application, generate a project type page view for selection of a project type by a user, upload documents, set the format, upload and link assets, refine assets, preview the generated interactive content object, save the interactive content object, update the interactive content object (and re-save if necessary), and export the interactive content object.

Returning to FIG. 2, storage module 32 is configured to store the generated interactive content object on non-transient electronic storage 40. Storage module 32 is configured to store the generated interactive content such that the generated interactive content object complies with the requirements of the video game application and/or the computer system gaming platform. Storage module 32 may be configured to store the interactive content object for later transfer to a computer system gaming platform and/or other interactive media device. Transfer to a computer system gaming platform and/or other interactive media device may comprise remotely transmitting the interactive content object to the computer system gaming platform and/or other interactive media device over a wireless network, downloading the interactive content object over the internet, saving a copy to a memory device for manual transmission to the computer system gaming platform and/or other interactive media device, and/or other modes of transfer.

Non-transient electronic storage 40 may be configured to store electronic information. Non-transient electronic storage 40 may be configured to store the generated interactive content object. In some implementations, electronic storage 40 may be configured to store, for example, entries and/or selections by the user via user interface 50 during population of a template. The selections may be accessed by interactive content object generation module 28 during generation of the interactive content object and/or at other times. The interactive content object generated by interactive content object module 28 may be stored on electronic storage module 40.

Electronic storage 40 may be configured to store software algorithms, information determined by processor 20, information received via user interface 50, and/or other information that enables system 10 to function properly. The electronic storage media of electronic storage 40 may comprise one or both of system storage that is provided integrally (i.e., substantially non-removable) with one or more components of system 10 and/or removable storage that is connectable to one or more components of system 10 via, for example, a port (e.g., a USB port, a firewire port, etc.) or a drive (e.g., a disk drive, etc.). Electronic storage 40 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 40 may be (in whole or in part) a separate component within one or more components of system 10, or electronic storage 40 may be provided (in whole or in part) integrally with one or more other components of system 10 (e.g., user interface 50, and/or processor 20).

User interface 50 is configured to provide an interface between system 10 and one or more users through which the user provides information to and receives information from system 10. This enables data, results, and/or instructions and any other communicable items, collectively referred to as "information," to be communicated between the user and one or more of processor 20, electronic storage 40, and/or other components of system 10. Examples of interface devices suitable for inclusion in user interface 50 include a keypad, buttons, switches, a keyboard, knobs, track pad/touch panel, levers, a display screen, a touch screen, speakers, a microphone, a printer, and/or other interface devices. It is to be understood that other communication techniques, either hard-wired or wireless, are also contemplated by the present disclosure as user interface 50. Other exemplary input devices and techniques adapted for use with system 10 as user interface 50 include, but are not limited to, an RS-232 port, RF link, an IR link, modem (telephone, cable or other). In short, any technique for communicating information with system 10 is contemplated by the present disclosure as user interface 50.

In some embodiments, information entered by a user through user interface 50 to system 10 may include, for example, designation of a type of interactive content object (e.g., an instruction manual, a strategy guidebook, a cheat book, a mini-game, or episodic content, etc.), information related to the video game intended to populate one or more fields of the template, and/or other information.

Processor 20 is configured to provide information processing capabilities in system 10. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 includes a plurality of processing units. These processing units may be physically located within the same device, or processor 20 may represent processing functionality of a plurality of devices operating in coordination.

Processor 20 may be configured to execute modules 22, 24, 26, 28, and/or 32 by software; hardware; firmware; some combination of software, hardware, and/or firmware; and/or other mechanisms for configuring processing capabilities on processor 20. It should be appreciated that although modules 22, 24, 26, 28, and 32 are illustrated in FIG. 1 as being co-located within a single processing unit, in implementations in which processor 20 includes multiple processing units, one or more of modules 22, 24, 26, 28, and/or 32 may be located remotely from the other modules. The description of the functionality provided by the different modules 22, 24, 26, 28, and/or 32 described below is for illustrative purposes, and is not intended to be limiting, as any of modules 22, 24, 26, 28, and/or 32 may provide more or less functionality than is described. For example, one or more of modules 22, 24, 26, 28, and/or 32 may be eliminated, and some or all of its functionality may be provided by other ones of modules 22, 24, 26, 28, and/or 32. As another example, processor 20 may be configured to execute one or more additional modules that may perform some or all of the functionality attributed below to one of modules 22, 24, 26, 28, and/or 32.

Figure 9:
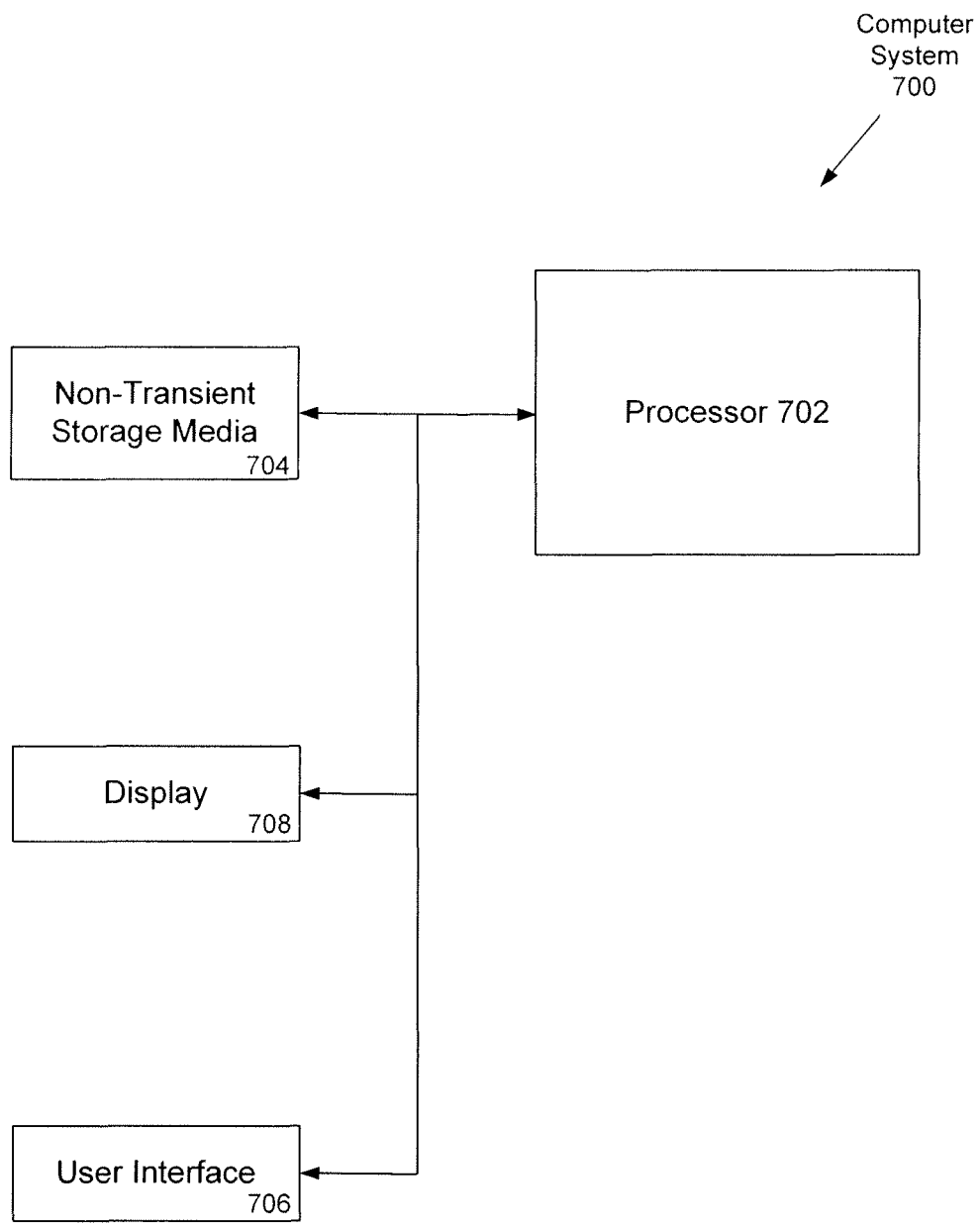
FIG. 9 is a schematic illustration of a computer system configured to execute the interactive content object.

FIG. 9 is a schematic illustration of a computer system 700 configured to execute the interactive content object (e.g., interactive content object 2 shown in FIG. 1) generated by system 10 (described in FIG. 2) and/or the video game application. Computer system 700 may be an interactive media device such as a video game console, a mobile phone, a laptop computer, a desktop computer, a tablet computer, and/or other interactive media devices. In some implementations, computer system 700 may comprise a processor 702, non-transient storage media 704, a user interface 706, a display 708, and/or other components.

Processor 702 is configured to provide information processing capabilities in computer system 700. As such, processor 702 may include one or more of a digital processor, an analog processor, a digital circuit designed to process information, an analog circuit designed to process information, a state machine, and/or other mechanisms for electronically processing information. Although processor 702 is shown in FIG. 9 as a single entity, this is for illustrative purposes only. In some implementations, processor 702 includes a plurality of processing units. These processing units may be physically located within the same device, or processor 702 may represent processing functionality of a plurality of devices operating in coordination.

In some implementations, processor 702 may be configured to obtain the interactive content object. Obtaining the interactive content object may comprise receiving transmission of the interactive content object from a server via communication with the server over a wired and/or wireless network, downloading the interactive content object directly from the non-transient electronic storage of another device (e.g., non-transient electronic storage 40 shown in FIG. 2), saving the interactive content object from a memory device (e.g., a CDROM, USB flash drive, etc.) for manual transmission to computer system 700, and/or other modes of obtaining the interactive content object.

Figure 10:
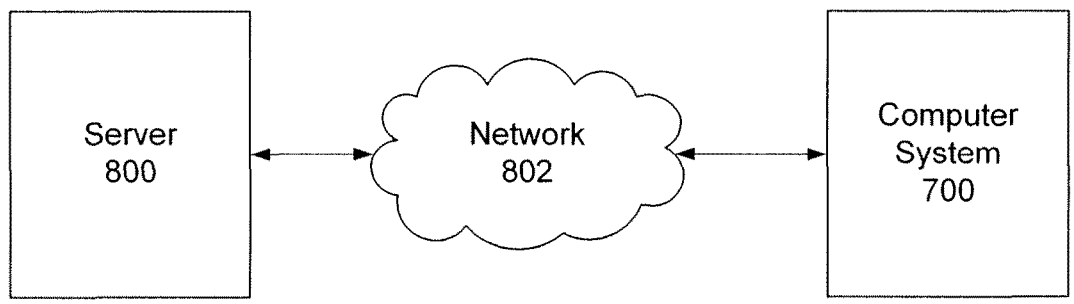
FIG. 10 is a schematic illustration of a computer system communicating with a server over a network.

By way of a non-limiting example, FIG. 10 schematically illustrates communication between computer system 700 and server 800 via a network cloud 802. Computer system 700 may be configured to receive transmission of the interactive content object from server 800 via network 802. Communication between computer system 700 and server 800 via network 802 may provide the ability for remote updating of the interactive content object. The electronic update to the interactive content object received by computer system 700 may be configured such that it does not update the video game application.

Server 800 may be configured to communicate with one or more client computing platforms (e.g., computer system 700) according to a client computing platform. In some implementations, communication may be wireless. In some implementations, server 800, computer system 700, and/or external resources may be operatively linked via one or more electronic communication links. For example, such electronic communication links may be established, at least in part, via a network such as the Internet and/or other networks (e.g., network 802). It will be appreciated that this is not intended to be limiting, and that the scope of this disclosure includes implementations in which server 800, computer system 700, and/or external resources may be operatively linked via some other communication media.

Returning to FIG. 9, Processor 702 may be configured to store the interactive content object on non-transient storage media 704. Processor 702 may be configured to store the interactive content object responsive to obtaining the interactive content object. In some embodiments, non-transient storage media 704 may be configured to store software algorithms, information determined by processor 702, information received via user interface 706, and/or other information that enables computer system 700 to function properly. The electronic storage media of non-transient storage media 704 may comprise one or both of system storage that is provided integrally (i.e., substantially non-removable) with one or more components of computer system 700 and/or removable storage that is connectable to one or more components of computer system 704 via, for example, a port (e.g., a USB port, a firewire port, etc.) or a drive (e.g., a disk drive, etc.). In some implementations, non-transient storage media 704 and non-transient electronic storage 40 may be the same storage media.

Processor 702 may be configured to execute the interactive content object. The interactive content object may comprise one or more electronic media files and/or a media player as described above with respect to FIG. 1-FIG. 7. The one or more electronic media files may comprise a different file type compared to the video game application such that the one or more electronic media files may be executed within the video game application, by the video game application. The media player may be configured to execute one or more of the electronic media files. Execution of the media files and/or the media player is described above with respect to FIG. 1.

In some implementations, computer system 700 may be configured to display the information related to the video game application to a user via display 708. Display 708 may be configured to present visual information to users. By way of non-limiting example, display 708 may include one or more of a television, a projector, a three dimensional display, a computer monitor, and/or other external display devices. In some implementations, the information displayed to the user may be displayed on a wireless client (not shown) that is separate from computer system 700. The wireless client may be configured to communicate with computer system 700 through a wireless network.

User interface 706 is configured to provide an interface between computer system 700 and one or more users through which the user provides information to and receives information from computer system 700. This enables data, results, and/or instructions and any other communicable items, collectively referred to as "information," to be communicated between the user and one or more of processor 702 and/or other components of system 10. Examples of interface devices suitable for inclusion in user interface 50 include a keyboard, a touch screen, a printer, and/or other interface devices.

Figure 11:
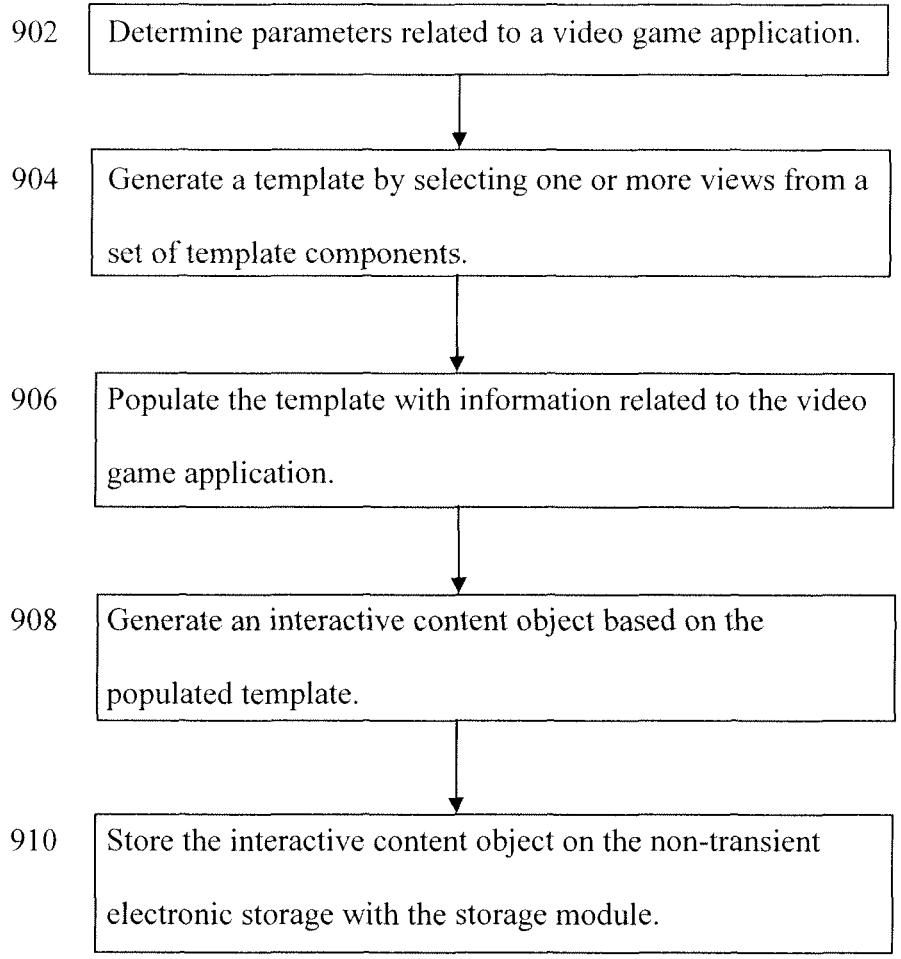
FIG. 11 illustrates a method for automated generation of an interactive content object with a generation system.

FIG. 11 illustrates a method 900 for automated generation of an interactive content object with a generation system. The interactive content object may be configured with content related to a video game application. The generation system may comprise non-transient electronic storage and a processor. The processor may be configured to execute computer program modules. The computer program modules may comprise a parameter determination module, a template generation module, a template population module, an interactive content object generation module, and a storage module.

FIG. 12 illustrates a method 1000 to execute an interactive content object. The interactive content object may be configured with content related to a video game application. Method 1000 may be implemented on a computer system. The computer system may be configured to execute the video game application.

The operations of methods 900, and/or 1000 presented below are intended to be illustrative. In some implementations, methods 900 and/or 1000 may be accomplished with one or more additional operations not described, and/or without one or more of the operations discussed. Additionally, the order in which the operations of methods 900 and/or 1000 are illustrated in FIG. 11 and/or FIG. 12 and described below is not intended to be limiting.

In some implementations, methods 900 and/or 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 and/or 1000 in response to instructions stored electronically on one or more electronic storage mediums. The one or more processing devices may include one or more devices configured through hardware, firmware, and/or software to be specifically designed for execution of one or more of the operations of methods 900 and/or 1000.

Referring to FIG. 11, at an operation 902 of method 900, parameters related to the video game application are determined with the parameter determination module. In some implementations, operation 902 may be performed by a parameter determination module the same as or similar to parameter determination module 22 (shown in FIG. 2 and described herein).

At an operation 904, a template is generated with the template generation module. The template is generated by selecting one or more views from a set of template components. The selection of the one or more template views is based on information determined by the parameter module. In some implementations, operation 904 may be performed by a template generation module the same as or similar to template generation module 24 (shown in FIG. 2 and described herein).

At an operation 906, the template is populated with information related to the video game application by the template population module. In some implementations, operation 906 may be performed by a template population module the same as or similar to template population module 26 (shown in FIG. 2 and described herein).

At an operation 908, the interactive content object is generated. The interactive content object is generated based on the populated template. The interactive content object comprises electronic media files and a media player. The media player is configured to execute one or more of the electronic media files within the video game application. The media player is executable by the video game application. In some implementations, operation 908 may be performed by an interactive content object generation module the same as or similar to interactive content object generation module 28 (shown in FIG. 2 and described herein).

At an operation 910, the interactive content object may be stored on the non-transient electronic storage with the storage module. In some implementations, operation 910 may be performed by a storage module the same as or similar to storage module 32 (shown in FIG. 2 and described herein).

Referring to FIG. 12, at an operation 1002 of method 1000, an interactive content object having content related to the video game application may be obtained. The interactive content object comprises one or more electronic media files and a media player. The media player may be configured to execute one or more of the electronic media files. The media player is executable by the video game application. In some implementations, operation 1002 may be performed by a processor the same as or similar to processor 702 (shown in FIG. 9 and described herein).

At an operation 1004, the video game application is executed. In some implementations, operation 1004 may be performed by a processor the same as or similar to processor 702 (shown in FIG. 9 and described herein).

At an operation 1006, electronic media files are executed with the video game application. In some implementations, operation 1006 may be performed by a processor the same as or similar to processor 702 (shown in FIG. 9 and described herein).

At an operation 1008, information related to the video game application is determined. In some implementations, operation 1008 may be performed by a processor the same as or similar to processor 702 (shown in FIG. 9 and described herein).

At an operation 1010, the information related to the video game application may be displayed to a user responsive to user input requesting information. In some implementations, operation 1010 may be performed by a display the same as or similar to display 708 (shown in FIG. 9 and described herein).

At an operation 1012, the determined and displayed information may be updated based on one or more of user input, the user's progression through the video game application, or an electronic update to the interactive content object received by the computer system. In some implementations, operation 1012 may be performed by a processor the same as or similar to processor 702 (shown in FIG. 9 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for automated generation of an interactive content object for presentation to a user, the interactive content object having content related to a video game application, the system comprising:
   non-transient electronic storage configured to store electronic information; and one or more physical computer processors configured by computer readable instructions to:
     determine parameters related to the video game application, at least one of the parameters being determined based on current game play data from the video game application;
     generate a template for the interactive content object, the template specifying one or more views defined by the interactive content object for presentation to the user;
     select template components for the views based on the determined parameters, the template components including one or more of an entry field, text, a graphic, a navigational linkage, a search field, or a video field;
     populate the selected template components with information related to the video game application, the information related to the video game application being dynamically determined based on one or more of the parameters; and
     generate the interactive content object based on the populated template.

2. The system of claim 1, wherein the parameters comprise one or more of the video game application assets, an interactive media device configured to run the video game application, a video game application controller, a game genre, or a target demographic.

3. The system of claim 1, wherein the interactive content object comprises one or more of an instruction manual, a strategy guidebook, a cheat book, a mini-game, or episodic content.

4. The system of claim 3, wherein a user determines the type of interactive content object by making selections via the user interface, the user interface configured to provide an interface between the system and the user through which the user provides information to and receives information from the system.

5. The system of claim 1, wherein the one or more physical computer processors are configured by computer readable instructions to guide a user to populate the template with information related to the video game application.

6. The system of claim 5, wherein the one or more physical computer processors are configured by computer readable instructions to guide a user to populate one or more fields of one or more views of the template with information related to the video game application.

7. The system of claim 6, wherein the user populates the one or more fields via the user interface, the user interface configured to provide an interface between the system and the user through which the user provides information to and receives information from the system.

8. A method for automated generation of an interactive content object with a generation system, the interactive content object having content related to a video game application, the generation system comprising non-transient electronic storage and one or more physical computer processors, the method comprising:
    determining parameters related to the video game application, the parameters including at least one parameter determined based on current game play data from the video game application;
    generating a template for the interactive content object, the template specifying one or more views defined by the interactive content object for presentation to a user;
    selecting template components for the views based on the determined parameters, the template components including one or more of an entry field, text, a graphic, a navigational linkage, a search field, or a video field;
    populating the selected template components with information related to the video game application, the information related to the video game application being dynamically determined based on one or more of the parameters; and
    generating the interactive content object based on the populated template.

9. The method of claim 8, wherein the parameters comprise one or more of the video game application assets, an interactive media device configured to run the video game application, a video game application controller, a game genre, or a target demographic.

10. The method of claim 8, wherein the generated interactive content object complies with the parameters related to the video game application determined and technical requirements of an interactive media device configured to run the video game application.

11. The method of claim 8, wherein the interactive content object comprises one or more of an instruction manual, a strategy guidebook, a cheat book, a mini-game, or episodic content.

12. The method of claim 11, further comprising determining the type of interactive content object based on selections received via the user interface, the user interface configured to provide an interface between the system and the user through which the user provides information to and receives information from the system.

13. The method of claim 8, further comprising guiding a user to populate the template with information related to the video game application.

14. The method of claim 13, further comprising guiding a user to populate one or more fields of one or more views of the template with information related to the video game application.

15. The method of claim 14, further comprising populating the one or more fields via the user interface, the user interface configured to provide an interface between the system and the user through which the user provides information to and receives information from the system.

16. A method to execute an interactive content object having content related to a video game application, the method implemented on a computer system, the computer system configured to execute the video game application, the method comprising:
    obtaining an interactive content object having content related to the video game application, the interactive content object comprising one or more electronic media files;
    executing the video game application; and
    executing the electronic media files with the video game application, wherein
execution of the electronic media files comprises:
    determining information related to the video game application, the information related to the video game application being dynamically determined based on one or more of current game play data from the video game application, saved game play data from the video game application, or video game application metrics;
    displaying the information related to the video game application to a user within a user interface responsive to user input requesting information; and
    updating the determined and displayed information based on one or more of user input, the user's progression through the video game application, or an electronic update to the interactive content object received by the computer system.

17. The method of claim 16, wherein the computer system comprises non-transient storage media, and wherein the interactive content object is stored on the non-transient storage media.

18. The method of claim 16, wherein the computer system is an interactive media device, and wherein the interactive media device comprises one or more of a video game console, a mobile phone, a laptop computer, a desktop computer, or a tablet computer.

19. The method of claim 16, wherein the one or more electronic media files comprise a different file type compared to the video game application such that the one or more electronic media files may be executed within the video game application, by the video game application.

20. The method of claim 16, wherein the electronic update to the interactive content object received by the computer system does not update the video game application.

21. The method of claim 16, wherein determining the information related to the video game application comprises reading the current game play data from the video game application, reading the saved data from the video game application, performing a search within the video game application based on user input, or tracking video game application metrics.

22. The method of claim 16, wherein the interactive content object comprises one or more of an instruction manual, a strategy guidebook, a cheat book, a mini-game, or episodic content.

23. The method of claim 16, wherein the information displayed to the user is displayed on a wireless client that is separate from the computer system, and wherein the wireless client is configured to communicate with the computer system through a wireless network.

* * * * *